United States Patent

Rundle et al.

[11] Patent Number: 5,588,699
[45] Date of Patent: Dec. 31, 1996

[54] INFLATABLE SAFETY CUSHION

[76] Inventors: Christopher Rundle, 12598 SW. 60th Ct., Miami, Fla. 33156; Michael Borell, 7787 SW. 86th St., Apt. 310, Miami, Fla. 33143

[21] Appl. No.: 510,602

[22] Filed: Aug. 3, 1995

[51] Int. Cl.⁶ ........................................ B60J 1/42
[52] U.S. Cl. .............. 297/216.11; 297/488; 297/DIG. 3; 297/DIG. 6
[58] Field of Search ....................... 297/DIG. 3, DIG. 6, 297/464, 465, 485, 452.41, 216.11, 219.12, 256.15, 487, 488; 280/733; 441/102, 106, 108, 110, 111, 123; 5/449, 453, 454

[56] References Cited

U.S. PATENT DOCUMENTS

| | | | |
|---|---|---|---|
| 2,068,134 | 1/1937 | Houghton | 5/454 |
| 3,068,494 | 12/1962 | Pinkwater | 5/454 |
| 3,181,183 | 5/1965 | Allen | 441/123 X |
| 3,720,445 | 3/1973 | Bennett | 297/488 |
| 3,727,249 | 4/1973 | Bonthelius | 441/123 X |
| 3,803,652 | 4/1974 | Uyehara . | |
| 3,848,541 | 4/1976 | Schulman | 280/733 |
| 3,903,555 | 9/1975 | Busby | 441/123 X |
| 4,348,037 | 9/1982 | Law et al. . | |
| 4,437,628 | 3/1984 | Schwartz | 297/465 X |
| 4,662,850 | 5/1987 | Bostic, Sr. | 441/123 |
| 4,753,621 | 6/1988 | Lucas et al. | 441/123 X |
| 4,827,920 | 5/1989 | Rowell, Sr. | 297/465 X |
| 4,914,762 | 4/1990 | Perali et al. | 5/449 |
| 5,161,258 | 11/1992 | Coltrain | 297/465 X |
| 5,282,648 | 2/1994 | Peterson . | |
| 5,292,176 | 3/1994 | Artz . | |
| 5,314,235 | 5/1994 | Johnson | 297/DIG. 3 X |
| 5,330,255 | 7/1994 | Stawicki | 297/391 |
| 5,335,968 | 8/1994 | Sheridan et al. . | |
| 5,379,725 | 1/1995 | Roberson et al. | 297/465 X |
| 5,429,418 | 7/1995 | Lipper et al. | 297/465 |

*Primary Examiner*—Milton Nelson, Jr.
*Attorney, Agent, or Firm*—McHale & Slavin, P.A.

[57] ABSTRACT

An inflatable safety cushion for a child constructed of a one-piece inflatable structure having an upper portion with a centrally disposed aperture for placement about a child's neck, a middle section positionable over the chest of the child, and a lower section which accommodates a portion of each thigh of the child. A blood pressure bulb type manual pump is used for inflating the structure. When the device is placed around the neck of a child and properly inflated in conjunction with a seat restraining harness, the device operates in protecting the child's head, neck and chest from injury by maintaining the head and neck in a substantially vertical position and providing the cushioning effect to the upper torso and thigh area should impact occur. The device allows for the customization of various restraining mechanisms such as swings, car seats, airplane seats, and amusement park rides to accommodate the size of the child.

15 Claims, 2 Drawing Sheets

INFLATABLE SAFETY CUSHION

FIELD OF THE INVENTION

This invention relates to child seat restraints and more particularly to an inflatable safety cushion for use in combination with a child seat restraint.

BACKGROUND OF THE INVENTION

Securing a child in a moving object lessens or eliminates possible injury should the object be forced to make unexpected movements. The primary purpose of securement is to prevent the child from being thrown from the object during a sudden stop. For this reason, a typical seat restraint used in a object wraps around the upper torso of a child's body fixating the child to the seat. Child car seats are but one example of a device used to secure a child in a object wherein the child is secured to the child car seat and the child car seat is secured to an adult car seat. Seat restraints are used in carnival rides, bicycle seats, swing sets, airplanes and so forth.

Improper securement of a child may exasperate an injury. A child is maintained in a child's safety seat used in a object by fastening the child seat to the object by use of a seat belt. A harness integrated in the safety seat is then used to fasten the child in position. A problem arises in that a child grows on a monthly basis making it cost prohibitive to purchase a custom object seat to accommodate the growth. The result is the use of child object seats that accommodate a range of child growth by use of adjustable harnesses.

Placement of a one year old child in a seat suitable for a five year old results in poor restraint as the child could slip through the harness thus affording little or no protection. Similarly, an older child may be too big for the child seat. The smaller seat may result in placing the child's head above the seat structure wherein the structure itself may cause injury to the child in a sudden sideward movement should the child's head impact the structure.

Even if a child restraint device is properly sized for a child, no provisions are made for support of the child's head during a sudden stop or collision. It is well known that during growth the child's neck is susceptible to whiplash due to lack of muscle support. If an automobile is required to make a sudden stop, even if no collision occurs, the weight of the child's head will cause forward movement. When the stop is complete the head may quickly snap back leading to injury.

Movement is not limited to automobiles and may be viewed at any playground. A child placed on a swing may be pushed in a direction beyond the child's neck strength causing injury. Amusement park rides are yet another example of objects that are especially prone to this problem as the seating must accommodate a wide range of body sizes yet provide quick adjustment for entertainment purposes. In many instances a metal bar is pressed against the chest of a person with little or no provision made to comfortably secure a child in such a seat.

Neck support, or lack thereof, is further illustrated when a child falls asleep while sitting in an upright position. The neck muscles relax allowing the head to slump while at rest. This positioning can place the child's neck in a dangerous position causing curvature of the throat leading to improper breathing. The unsupported head may again lead to a dangerous situation should the child be subjected to a sudden movement.

One effort to accommodate stationary positioning of a child is disclosed in U.S. Pat. No. 5,292,176 which discloses an inflatable child object seat. The seat relies upon a seat belt for securing the device to a object with provisions for allowing adjustment to a support surface through an inflatable bottom panel, back panel, and side walls.

U.S. Pat. No. 4,348,037 discloses a safety device applicable to seat belt restraints. This device attaches to a object seat belt for cushioning the child against a rigid restraint by use of proportioned tautness.

U.S. Pat. No. 5,282,648 discloses an inflatable body and head restraint which operates like an inflatable air bag which automatically inflates upon impact. This device requires a gas generator and is not practical for use with small children where quick inflation may lead to injury in and of itself.

U.S. Pat. No. 5,292,176 discloses an inflatable child object seat having a complicated structure with a plurality of backing chambers forming a rear wall lined with opposing side walls. The device is designed to maintain the child in an upright position and cushion against side impact. As with the previous devices, this device fails to provide any type of head support and again maintains limitations of a fixed, rigid, inflatable chair with a harness sized for an average child.

U.S. Pat. No. 5,335,968 discloses a child's seat consisting of an inflatable seat member having a bottom wall, back wall and opposing side walls. A strap is used to maintain the child in position. The booster seat fails to provide support to the head and can further be reconciled with the object child seats as failing to provide a harness that does not fully accommodate all children.

Thus, what is lacking in the art is a safety device that provides a range of adjustability to accommodate various restraint systems.

SUMMARY OF THE INVENTION

The instant invention is an inflatable safety cushion having an upper section positionable around a child's neck, a middle section that is placed in front of the child's chest, and lower section which extends along the child's upper thigh area.

The upper section is formed from an inflatable chamber having a shape that prevents over extension of the neck by limiting head movement to a predetermined upright posture. The upper section further operates to cushion the head should a sudden movement or contact occur.

The middle section is placed over the chest area providing a cushioned area as well as harness support. This section houses a primary inflation chamber used to remove excess space between the child's chest and a seat restraint. The middle section is pneumatically communicated with the upper section through a predefined air chamber allowing excess pressure in the middle section to be directed to the upper section for additional support.

An alternative embodiment of the instant invention includes a harness engagement cover rotatably secured to each side edge of the middle section. The cover is formed from a flexible piece of material such as vinyl, canvas, or the like that is positioned against the outer surface of the middle section by use of hook and pile attachment commonly known as VELCRO. The cover allows placement of the restraining harness along the chest area wherein replacement of the cover engages the hook and pile material to secure the harness in a particular position. This engagement prohibits movement of the harness so that the straps do not interfere with arm movement and are correctly positioned for optimum safety.

The lower section is positioned over the upper thigh area allowing for the comfortable placement of a seat belt. The lower section includes an inflatable chamber that is shaped as two dependent legs to follow leg movement.

The inflatable safety cushion of the instant invention may be used in numerous situations providing for the comfort and safety of the child. For instance, the device may be used on a swing set operating as a cushion for the front of the child as well as head and neck support should the swing action become excessive or the child tired of maintaining his head in an upright position. A primary use of the instant invention is for placement in a child's vehicle seat wherein the device operates to customize the harness of the child's seat to the particular size and shape of the child; the upper section of the device operating to maintain the head of the child in an upright position for protection during a collision or quick stop. Inflation of the device is performed by a blood pressure type bulb pump providing adjustment for the comfort of the child.

Another application of the instant invention would be for use in an airline seat where a child seat may not be practical allowing a conventional seat belt to be placed over the lower section thereby distributing the weight of the seat belt whereby a strap around the waist of the child maintains the device in position.

Yet another use of the instant invention would be placement in a conventional high chair wherein the device removes excess space between the chest of the child and the eating table. As the device is made from an inflatable material such as vinyl, it operates as a bib as well as a spacing device to secure the child in position.

Still another use of the instant invention allows for placement of a strap around the torso of the body. Should a child be placed in an unsecured seating area such as an amusement park ride, the device operates to maintain the child's head in a substantially vertical position so as to prevent injuries should the child be subjected to sudden movements.

Accordingly, an objective of the instant invention is to provide an inflatable device for placement around a child's neck for use in protecting the child's head, neck and chest from injury during low impact or sudden movement by maintaining the head in a substantially vertical position and providing the cushioning effect to the upper torso area.

Still another objective of the instant invention is to provide a mechanism that allows for the customization of various devices such as swings, car seats, airplane seats, and amusement park rides wherein the inflatable safety cushion accommodates the excess space by use of a hand pump for quickly inflating the cushion to accommodate a particular situation.

Still another objective of the instant invention is to provide stability of a child's head and neck while sleeping in an upright position.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
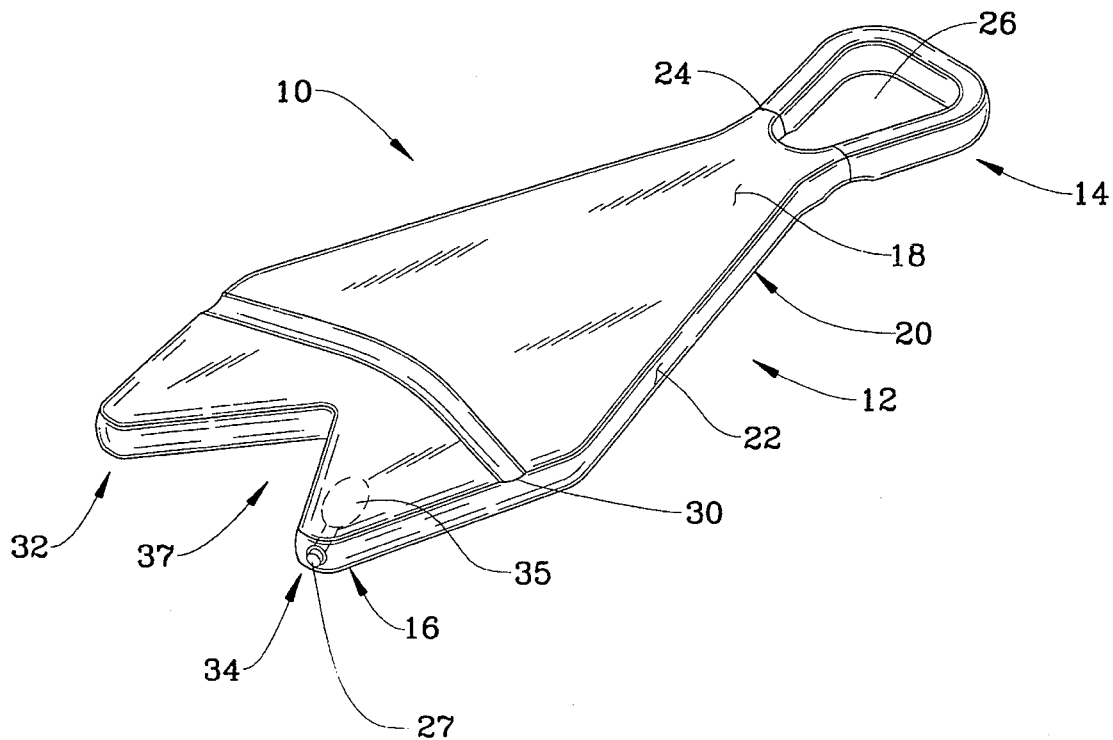
FIG. 1 is a perspective view of the instant invention.

Now referring to FIGS. 1, set forth is a first embodiment of the instant invention. The safety cushion 10 is a one-piece elongated inflatable structure constructed of vinyl, coated canvas, or the like inflatable material and delineated by a middle section 12, an upper section 14, and a lower section 16. The middle section 12 forms a primary inflation chamber defined from a frontal surface 18 spaced apart from a rearward surface 20 by a continuous outer side wall 22 forming the inflation chamber therebetween.

The upper section 14 is formed from the continuation of frontal surface 18 and rearward surface 20 as delineated along fold line 24. The fold line 24 allows the middle section 12 to be placed against the chest of a child with the upper section 14 folding over the shoulders of a child for comfortably positioning around the neck. A centrally disposed aperture 26 is sized to allow insertion of a child's head with an inner side wall 28 of the aperture placed adjacent the child's neck. In this manner, the frontal surface 18 is available for support of the head by having an enlarged side wall effectively raising the support surface of the shoulders to limit movement of the head. The frontal surface 18 on each side of the aperture 26 prevents over extension of the neck should the child fall asleep or be involved with movement which forces the head rearward or to either side.

The middle section 12 and the upper section 14 are pneumatically coupled together wherein filling of one section, such as the middle section 12, communicates air to a chamber formed in the upper section 14. Partial filling of either chamber provides air relocation should an impact occur against the frontal surface 18. Thus, pressure against the middle section 12 will distribute air and reinforce the upper section 14.

The lower section 16 is formed from a continuation of frontal surface 18 delineated from the middle section 12 along fold line 30 allowing the lower section 16 to fold in relation to the middle portion 12. The lower section 16 includes a first leg area 32 and second leg area 34 which is positionable over the upper thigh portion of a child. Middle section 36 forms a crotch 37 permitting air movement around the legs lessening as heat builds up. The lower section 16 further permits placement of a seat belt across the legs without discomfort by distributing the weight of the belt.

Air is inserted into the primary chamber by use of an air inflation valve 27 placed in the lower section 16 which allows air to be drawn in upon squeezing an air inflation bladder depicted by hidden lines 35 mounted within the lower section.

Figure 2:
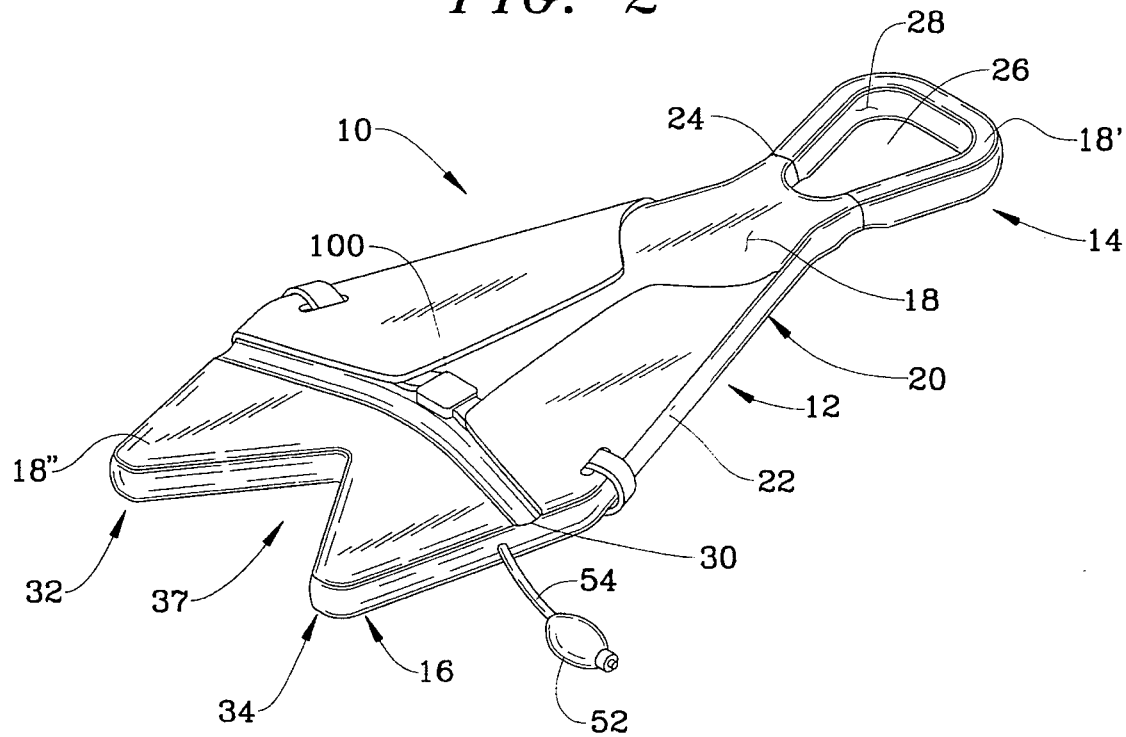
FIG. 2 is a perspective view of the instant invention having an attachment vest.
Figure 3:
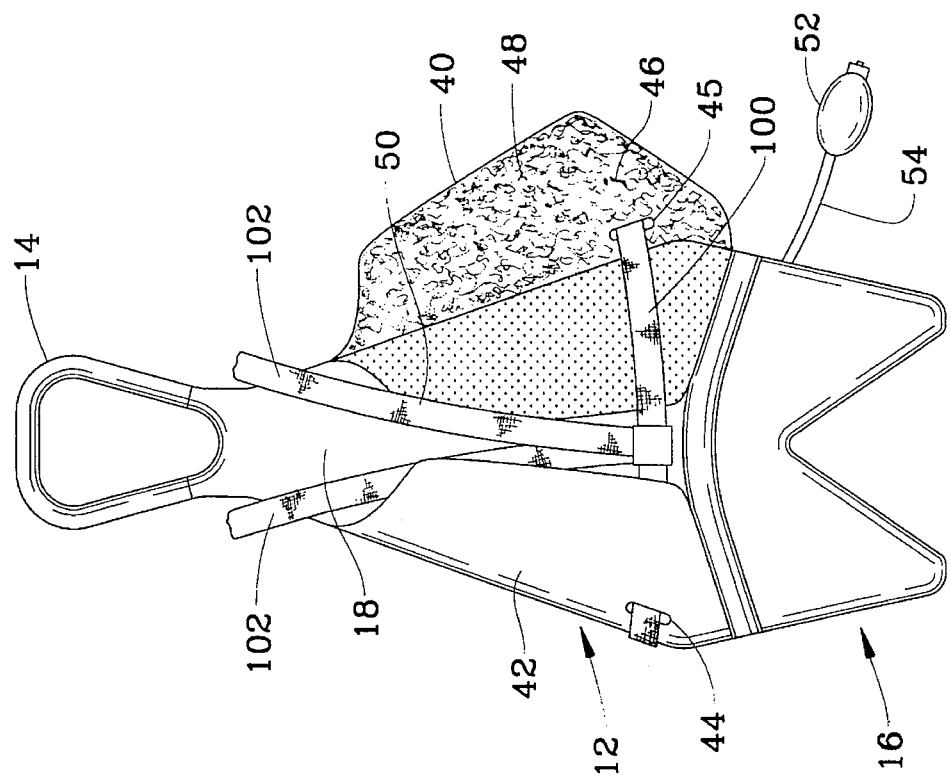
FIG. 3 is a front plane view of FIG. 2.

Now referring in general to FIGS. 2 and 3, set forth is the inflatable safety cushion 10 of the instant invention. The safety cushion 10 is a one-piece elongated inflatable structure constructed of vinyl, coated canvas, or the like inflatable material delineated by a middle section 12, an upper section 14, and a lower section 16. The middle section 12 forms a primary inflation chamber defined from a frontal surface 18 spaced apart from a rearward surface 20 by a continuous outer side wall 22 forming the inflation chamber therebetween.

The upper section 14 is formed from the continuation of frontal surface 18 and rearward surface 20 as delineated along fold line 24. The fold line 24 allows the middle section 12 to be placed against the chest of a child with the upper section 14 folding over the shoulders of a child for comfortably positioning around the neck. A centrally disposed aperture 26 is sized to allow insertion of a child's head with an inner side wall 28 of the aperture placed adjacent the child's neck. In this manner, the frontal surface 18 is available for support of the head by having an enlarged side wall effectively raising the support surface of the shoulders to limit movement of the head. The frontal surface 18 on each side of the aperture 26 prevents over extension of the neck should the child fall asleep or be involved with movement which forces the head rearward or to either side.

The middle section 12 and the upper section 14 are pneumatically coupled together wherein filling of one section, such as the middle section 12, communicates air to a chamber formed in the upper section 14. Partial filling of either chamber provides air relocation should an impact occur against the frontal surface 18. Thus, pressure against the middle section 12 will distribute air and reinforce the upper section 14.

The lower section 16 is formed from a continuation of frontal surface 18 delineated from the middle section 12 along fold line 30 allowing the lower section 16 to fold in relation to the middle portion 12. The lower section 16 includes a first leg area 32 and second leg area 34 which is positionable over the upper thigh portion of a child. Middle section 36 forms a crotch 37 permitting air movement around the legs lessening as heat builds up. The lower section 16 further permits placement of a seat belt across the legs without discomfort by distributing the weight of the belt.

Seat belt harness 100 is illustrated in a position typical of conventional restraint mechanisms with harness straps 102 positioned across the frontal surface 18 wherein covers 40 and 42, fitted to an edge of the frontal surface 18 on each side of the middle section 12, providing separation. The covers are not necessary to practice this invention but are preferred for maintaining the harness in the optimum safety position, spaced apart from the child's head. The covers prevent the child from placing their hands beneath the harness which may lead to injury during a sudden stop.

Each cover 40 and 42 is formed from a flexible piece of material such as vinyl, canvas, or the like material. Cover 40 is shown in an open position having inner surface 46 that is positionable against the frontal surface 18 of the middle section 12 by use of hook material 48 and pile material 50 commonly known by the trademark VELCRO. Upon opening of the cover, the restraining straps 100 may be inserted through aperture 44 on cover 42 and through aperture 45 on cover 40, 102 may be positioned accordingly. Upon replacement of the cover, the straps are secured in position as the VELCRO material 48 and 50 engages securing the harness in position. This engagement prohibits dislodgment of the harness as well as maintaining the device in position so that the harness does not interfere with arm movement or become injurious during head movement. It is noted that the covers may be exchanged for aperture tabs provided independently along each side wall providing a mechanism for maintaining the straps in a proper position.

The middle section 12 houses the primary air chamber and is used to inflate both the upper section 14 and the lower section 16 by use of pneumatic air passageways coupling each section together. Air is inserted into the primary chamber by use of a conventional air inflation valve or more preferably a blood pressure type bulb pump 52 secured to one of the chambers. The width of the upper section 14, as defined by fold line 24, is less than the width of the lower section 16, as defined by fold line 30. The increase in width allows for minimum spacial area around the child's neck area while providing maximum surface protection at the waist.

Figure 4:
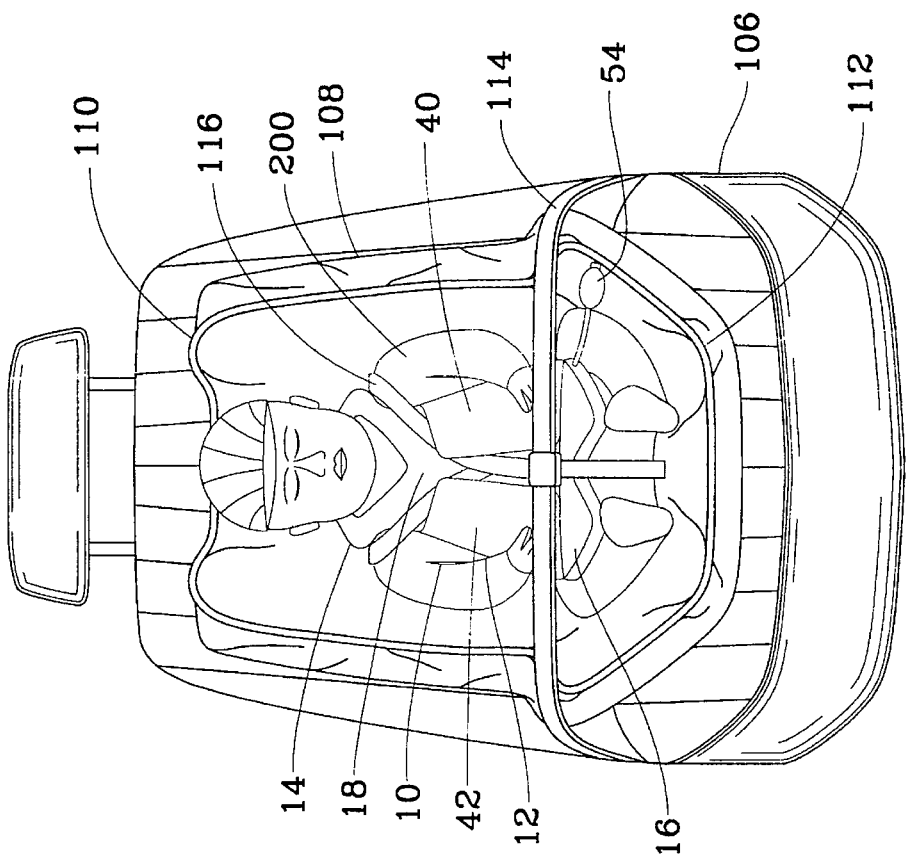
FIG. 4 is a pictorial view of a child in a car seat wearing the instant invention.

FIG. 4 sets forth a pictorial view of an automotive seat 106, having a child's car seat 108 strapped in position by seat belt 114. The child's seat 108 is a conventional L-shaped rigid structure having upper edge 110 and lower edge 112. A child 200 placed within the confines of the structure is secured thereto by harness 116. In this manner, the inflatable child's safety cushion 10 is placed beneath the harness 116 allowing the child's seat 108 to accommodate a smaller child by inflating the cushion to provide proper spacing of the harness 116. The inflatable cushion distributes the weight of the harness so as not to cause irritation to the child and does not inhibit movement. Once the child is properly restrained the air pump 54 is used to inflate/deflate the chambers accordingly. As previously mentioned, each chamber is pneumatically coupled thereby allowing air distribution between the lower, middle, and upper sections.

The upper section 14 provides support to the child's head if the child's head is placed in an angular position which commonly occurs during resting. Should the object that the child is secured in come to a sudden stop, the device operates as a cushion allowing air movement between the chambers thereby lessening the impact as well as causing inflation of the upper section for further support of the child's head. As previously mentioned, the car seat embodiment is but one example of the use of the instant invention as the device may further be employed on restraint systems that lack a harness such as an amusement ride wherein the device is coupled directly to the child's body by use of a strap that wraps around the child's back.

It is to be understood that while we have illustrated and described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A safety device for a child used in combination with a seat belt harness, said device comprising:

a one-piece inflatable structure defined by a front side surface spaced apart from a rear side surface by a continuous outer side wall, said structure delineated by an upper section having a width approximating the width of a child's head, a middle section having a width approximating the width of a child's torso, and a lower section having a width approximating the width of a child's thighs; an aperture centrally disposed in said upper section and sized for placement over a child's head, an inner side wall having a minimal spacial separation from said outer side wall defining said upper section; an inlet means for inflating said structure; said structure placed beneath a seat belt harness for securing said structure to the child wherein a child's head is inserted through said aperture with said middle section residing against the torso of the child and said lower section placed over the thighs of the child whereby a seat belt harness placed over the front surface of said structure allows said structure to be inflated through said inlet means to remove excess space between the seat belt harness and child providing the child with a properly positioned restraint that further operates as an air cushion.

2. The device according to claim 1 wherein each said upper, middle, and lower section includes at least one inflatable chamber, each chamber pneumatically communicated wherein air placed in one chamber is distributed to the remaining chambers.

3. The device according to claim 1 wherein said structure is constructed from vinyl.

4. The device according to claim 1 wherein said structure is constructed from rubber lined canvas.

5. The device according to claim 1 including an air pump formed integral to said inlet means, said air pump allowing manual inflation of said structure.

6. The device according to claim 5 wherein said air pump is concealed within said structure.

7. The device according to claim 1 including a means for securing a harness to said front side surface of said middle section.

8. A safety device for a child used in combination with a seat belt harness, said device comprising:

a one piece elongated inflatable structure defined by a front side surface spaced apart from a rear side surface by a continuous outer side wall forming a chamber therebetween and a centrally disposed aperture having an inner side wall communicating said front side surface to said rear side surface, said structure delineated by a first fold line forming an upper section having an aperture positionable about the neck of a child, a middle section positionable over the torso of the child, and a lower section delineated by a second fold line positionable over a portion of each thigh of the child, said middle section including a first and second cover assimilating a vest with a fastening means for securing a harness between said cover and said front surface; means for inflating said chamber; and a means for securing said structure to a seat belt harness; wherein said structure provides an adjustable cushion for the child's head, chest and thigh area, said first and second cover securing seat seat belt harness between each said cover and said frontal surface.

9. The device according to claim 8 wherein said means for inflating is further defined as a bulb air pump formed integral to said chamber.

10. The device according to claim 8 including an aperture positioned in said first and second cover and sized for placing a seat belt harness therethrough.

11. The device according to claim 8 wherein said fastening means is defined as hook and pile attachment material disposed on a portion of an inner surface of each said cover having a reciprocal attachment material positioned on a portion of said front side surface.

12. The device according to claim 8 wherein said structure is constructed from vinyl.

13. The device according to claim 8 wherein said structure is constructed from rubber lined canvas.

14. The device according to claim 8 wherein said first fold line is of a horizontal width less than said second fold line.

15. The device according to claim 8 wherein said upper, middle, and lower sections form individual pneumatically coupled chambers.

\* \* \* \* \*